United States Patent [19]

Mottez et al.

[11] 3,714,053

[45] Jan. 30, 1973

[54] PLASTICIZERS FOR VINYL POLYMERS AND PROCESSES FOR THEIR PRODUCTION

[75] Inventors: Paul Mottez, Loison-sous-Lens; Regis Lejeune, Lens, both of France

[73] Assignee: Societe Chimique des Charbonnages, Paris, France

[22] Filed: Nov. 9, 1970

[21] Appl. No.: 88,147

[30] Foreign Application Priority Data

Nov. 7, 1969 France..............................6938438

[52] U.S. Cl. ................252/182, 260/29.6, 260/469, 260/475
[51] Int. Cl. ..............................................C09k 3/00
[58] Field of Search............252/182; 260/469, 475 R

[56] References Cited

UNITED STATES PATENTS 2,862,959  12/1958  Patrick, Jr. et al...................260/475

Primary Examiner—John D. Welsh
Attorney—Bucknam & Archer

[57] ABSTRACT

A plasticizer for a vinyl polymer consisting of a mixture of phthalate of (trimethyl pentane diol-1,3 monoisobutyrate) and of benzyl, and of phthalate of butyl or isobutyl and of benzyl and a process for the production thereof by reacting preferably 0.5 g. mole of trimethyl-2,2,4 pentane diol-1,3, monoisobutyrate with lg. mole of phthalic anhydride, reacting the product with a butyl alcohol, neutralizing the obtained phthalates and reacting the salts with benzyl chloride to esterify the remaining unesterified functions of the phthalic anhydride to form the plasticizer.

10 Claims, No Drawings

PLASTICIZERS FOR VINYL POLYMERS AND PROCESSES FOR THEIR PRODUCTION

The present invention relates to novel plasticizers used for vinyl polymers and their preparation procedure.

It is known that the esters of alcohols or polyols, and principally of diols with a neopentyl structure, confer on vinyl compositions or compounds in which they are incorporated, alone or associated with other plasticizers, a good resistance to discoloration and to external soiling, as well as to the action of lustre finish acrylic products.

The esters of these types of alcohols or polyols, or of ester alcohols, with mixed organic acids, as also the esters of organic acids with these mixed alcohol have proprietary anologues.

Amongst the alcohols which are suitable are neopentylglycotrimethyl pentane diols, trimethyl hexane diols, trimethyl-2,2,4 - pentane - diol - 1,3 mono isobutyrate as well as benzyl alcohol.

For the acids, phthalic acid, benoic acid, maleic acid, succinic acid, isobutyric acid or their eventual anhydrides can be employed.

Certain esters can actually be found on the market. They have a good resistance to discoloration, but they are sufficiently volatile and of poor permanence in vinyl compound plasticizers.

The invention has for its object novel plasticizers of vinyl polymers consisting of double esters of phthalic anhydride with trimethyl - 2,2,4 pentane diol - 1,3, a butyl alcohol and benzyl alcohol or benzyl chloride.

More particularly, the invention has for its object novel plasticizers constituted by a mixture of (trimethyl - 2,2,4 - pentane diol - 1,3 monoisobutyrate)-benzyl phthalate and butylbenzyl phthalate.

The invention concerns also a process for the preparation of novel plasticizers according to the invention and, more precisely, of mixtures of plasticizers according to the invention.

The invention relates also to novel products containing the vinyl polymers, plasticizers, the novel product according to the invention.

The process for the preparation of the novel products is characterized as follows:

One reacts in relative proportions, at most 1g.mol of trimethyl - 2,2,4 pentane-diol- 1,3 monoisobutyrate with 1g. mol of phthalic anhydride.

The product obtained is reacted with a sufficient quantity of a butyl alcohol as to form a monobutyl compound with the phthalic anhydride which was not reacted in the preceding reaction, then the phthalates thus obtained are neutralized by a alkaline base, preferably.

The salts thus prepared are reacted with a benzyl halide in a sufficient quantity to esterify the whole of the function still not esterified by the used phthalic anhydride.

It has been established that the reaction of the said diol monester with phthalic anhydride was quite slow and incomplete during the preparation of the phthalic acid, particularly towards the end of the reaction.

The reaction cannot be pushed too far, that is to say in utilizing a molar quantity of diol monester with regard to the phthalic anhydride insufficient to obtain the phthalic acid, the reaction is rapid.

Instead of reacting a gram molecule of phthalic anhydride with a gram molecule of mono-butyrate of trimethyl 2,2,4 - pentane-diol- 1,3 of the formula:

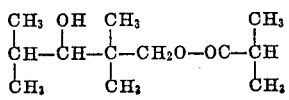

there is used therefore only a fraction of a gram molecule of the diol ester (preferably half a gram molecule) and in the place of the missing fraction, n-butyl alcohol or isobutyl alcohol is reacted.

The reaction of the diol ester with phthalic anhydride is effected first and therefore with a very great excess of the anhydride, without catalyst, at a temperature of 130° - 150° C. The esterification is, in this case, very rapid in contrast to a reaction in which equimolar quantities are employed. On adding n-butyl alcohol or isobutyl alcohol and on maintaining the temperature at 100° - 115° C, a mixture of diol monester phthalate and butyl or isobutyl phthalic acid is formed very quickly.

In the place of n-butyl alcohol or iso-butyl alcohol other alcohols obtained by the oxo reaction can be used.

The mixture of acid phthalates is then blended into a mixture of neutral phthalates, of which proportions of the constituent depends on the molar quantities of the used compounds having alcohol functions.

The sodium salts of the acid phthalates are formed in known manner, in aqueous solution, at a temperature of 80° - 90° C.

Benzyl chloride is then added to the mixture of the sodium salts of the acid phthalates, in the presence of a catalyst which is generally a tirtiary amine such as triethylamine, and at 100° - 130° C, a mixture (trimethyl - 2,2,4 -pentane-diol- 1,3 mono-isobutyrate)-benzyl phthalate and butylbenzyl phthalate is formed.

The interest of the procedure according to the invention for the direct preparation of the plasticizer mixture, ester A and ester B, is the rapidity of the initial reaction between the diol monoester and phthalic anhydride and, consequently, the rapidity of the preparation of the mixture.

The mixture of impure esters is then subjected to known treatments:
neutralization.
purification by steam distillation under reduced pressure.
decoloration by active carbon or decolorization.
filtration.
drying.

The mixture of purified phthalates is obtained with a yield of 90 percent. The mixture has the following characteristics when prepared as indicated further and the proportions of products put to work which have been mentioned there:

| | |
|---|---|
| Appearance | clear liquid |
| Color | 40–40 (Hazen Scale) |
| Baume viscosity | about 200 cp at 20°C |
| Density at 20°C | 1.108 |
| Acid member | 0.15 |
| Volatile materials (Heating 30mm at 180°C) | 0.7 |

In mixtures of this plasticizer mix with compounds based on PVC, one establishes a very good compatibility.

The efficiency of the product is 56 percent (per hundred parts by weight of resin, 56 parts by weight of plasticizer, minimum proportion necessary to obtain a given flexibility).

One type of mixture of this plasticizer and compounds based on PVC is given hereafter:

| | |
|---|---|
| PVC | 100 parts by weight |
| Plasticizer | 40 parts by weight |
| Stabilizer (Ba and Cd salts) | 1.2 parts by weight |
| Carbonate of lime | 70 parts by weight |
| Titanium oxide | 2 parts by weight |

The extractability of the plasticizer by certain chemical agents is shown in the following table:
(expressed by the percentage of loss of weight of the samples)

| Proportion of plasticizer (in parts by weight per hundred parts by weight of resin) | 30 | 40 | 50 | 65 |
|---|---|---|---|---|
| Essence F | 0.012 | 0.012 | 0.014 | 0.020 |
| Mineral oil | 0.17 | 0.39 | 0.85 | 1.67 |
| Distilled water | 0.33 | 0.31 | 0.30 | 0.29 |
| Soap suds at 1% by weight | 0.15 | 0.19 | 0.26 | 0.70 |

The resistance to discoloration has been determined by the action, on a plasticized sample, of bitumen "Friabit U70," after six hours at 50° C in an oven. Result:— very slight blemish.

The mixture of plasticizers and PVC have the following physical and mechanical properties:

PHYSICAL PROPERTIES

| Proportion of plasticizer (in parts by weight per 100 parts of resin) | 30 | 40 | 50 | 65 |
|---|---|---|---|---|
| Density | 1.34 | 1.33 | 1.30 | 1.28 |
| Hardness (Shore A) | 96 | 94 | 90 | 77 |

MECHANICAL PROPERTIES

RESISTANCE TO TRACTION

| Proportion of plasticizer (in parts by weight per 100 parts by weight of resin) | 30 | 40 | 50 | 65 |
|---|---|---|---|---|
| R KgF/cm² | 360 | 235 | 213 | 192 |
| M KgF/cm² | | 228 | 151 | 92 |
| A% | 95 | 223 | 310 | 356 |

R: Load to rupture
M: 100% elongation modulus
A: elongation to rupture

EXAMPLE

By way by example, there is given hereafter a detailed description of a mode of preparation of a mixture of (trimethyl-2,2,4 - pentane-diol- 1,3 monoisobutyrate)-benzyl phthalate and butylbenzyl phthalate:

There is charged into the apparatus

| | |
|---|---|
| 0.5 mole trimethyl-2,2,4-pentane diol-1,3 monoisobutyrate | 108,8 g |
| 1.0 mole phthalic anhydride | 148 g |

The mixture is heated to 135° C and maintained for one hour at this temperature. The acid number of the product ought then to be in the region of 326.

The mixture is cooled to 100° C and there is introduced:

0.5 mole n-butyl alcohol
The 37 g

The mixture is then carefully heated to 100° – 105° C, until start of the exothermic reaction. It is not advisable to exceed 115° C. This temperature is maintained for half an hour. The acid number ought then to be in the region of 191. The mixture is cooled to 80° C; 4 moles (72g) of water are added, and then a quantity of sodium carbonate sufficient to give a pH of 8–8.5.

At this moment there is added:

| | |
|---|---|
| 1 mole benzyl chloride | 126.5 g |
| triethylamine | 2.5 g |

The mixture is boiled for six hours (110°–130° C), then it is cooled to 80°–85° C and 6 moles (108g) of water are introduced.

If the pH is acid, sodium carbonate is added to give a pH of 8. The mixture is decanted, washed, distilled by steam at 120°–125° C for one hour, and then dried under vacuum.

A mixture of phthalates (347g 90% theoretical) is obtained.

This plasticizer mixture can be used along or mixed with other plasticizers, or extended with butyl benzyl phthalate, according to the desired anti discoloration properties.

If instead of n-butyl alcohol, isobutyl alcohol is employed, the mode of operation is exactly the same and the mixture of phthalates obtained has very similar properties.

What is claimed is:

1. A process for the production of a plasticizer, comprising the steps of (i) reacting in relative proportions, at most 1g. mole of trimethyl-2,2,4 pentane-diol-1,3 mono-isobutyrate with 1g. mole of phthalic anhydride, (ii) reacting the obtained product with a butyl alcohol so as to form a monobutyl phthalate, the operating conditions being chosen so that after this reaction there exists no more phthalic anhydride which has not reacted, (iii) neutralizing the phthalates thus obtained by means of an alkaline base, (iv) reacting the salts thus prepared with a benzyl halide in a sufficient quantity to esterify the whole of the functions, not yet esterified, of the phthalic anhydride used.

2. A process as claimed in claim 1, wherein the butyl alcohol is selected from n-butyl alcohol and isobutyl alcohol.

3. A process as claimed in claim 1, wherein the first esterification step is effected at a temperature of between 130° and 150° C and in the absence of a catalyst.

4. A process as claimed in claim 1, wherein the second esterification is effected at a temperature of between 100° C and 115° C.

5. A process as claimed in claim 1, wherein the neutralization is effected at a temperature between about 80° C and 90° C.

6. A process as claimed in claim 1, wherein the reaction of the salts of the phthalates with the benzyl halide is effected utilizing benzyl chloride, operated at a temperature of between 110° C and 130° C and in the presence, as a catalyst, of a tertiary amine.

7. A process as claimed in claim 1 wherein the quantity of trimethyl-2,2,4 pentane diol-1,3 mono-isobutyrate is 0.5 molecule per molecule of phthalic anhydride.

8. The product prepared by the process of claim 1.
9. The product prepared by the process of claim 2.
10. The product prepared by the process of claim 7.

* * * * *